US012725788B2

(12) United States Patent
Watanabe

(10) Patent No.: US 12,725,788 B2
(45) Date of Patent: Sep. 1, 2026

(54) COMPOSITE POSITIVE ELECTRODE ACTIVE MATERIAL

(71) Applicant: TOYOTA JIDOSHA KABUSHIKI KAISHA, Toyota (JP)

(72) Inventor: Hideaki Watanabe, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 784 days.

(21) Appl. No.: 18/090,675

(22) Filed: Dec. 29, 2022

(65) Prior Publication Data

US 2023/0282809 A1 Sep. 7, 2023

(30) Foreign Application Priority Data

Mar. 4, 2022 (JP) ................................ 2022-033187

(51) Int. Cl.

*H01B 1/08* (2006.01)
*H01M 4/36* (2006.01)
*H01M 4/485* (2010.01)

(52) U.S. Cl.

CPC .............. *H01M 4/366* (2013.01); *H01B 1/08* (2013.01); *H01M 4/485* (2013.01)

(58) Field of Classification Search

CPC ........... H01B 1/00; H01B 1/08; H01M 4/366; H01M 4/40; H01M 4/485

See application file for complete search history.

(56) References Cited

U.S. PATENT DOCUMENTS 11,837,723 B2 * 12/2023 Yoshihara ............. H01M 4/505
2020/0127287 A1 4/2020 Yamauchi et al.
2021/0234158 A1 7/2021 Washida et al.
2021/0288307 A1 9/2021 Nakayama et al.
2022/0085347 A1 3/2022 Kubota et al.
2022/0271283 A1 * 8/2022 Sun ........................ C01G 53/00
2023/0083478 A1 * 3/2023 Wu ........................ C01G 53/50
2023/0343954 A1 * 10/2023 Yu ..................... H01M 10/0525

FOREIGN PATENT DOCUMENTS

JP 2012-99323 A 5/2012
JP 2018-045802 A1 3/2018
JP 2022-047501 A 3/2022
KR 20230054948 A * 4/2023
WO 2020/022305 A1 1/2020
WO 2020067425 A1 4/2020

OTHER PUBLICATIONS

Zhang et al "Surface coating with Li3BO3 protection layer to enhance the electrochemical performance and safety properties of Ni-rich LiNi0.85Co0.05Mn0.10O2 cathode material", Powder Technology 394 (2021) 448-458.*

Zhu et al "More than just a protection layer: Inducing chemical interaction between Li3BO3 and LiNi0$5Mn1$5O4 to achieve stable high-rate cycling cathode materials", Electrochimica Acta 342 (2020) 136074.*

Nefedova et al "The Effect of the Lithium Borate Surface Layer on the Electrochemical Properties of the Lithium-Ion Battery Positive Electrode Material LiNi1/3Mn1/3Co1/3O2", ISSN 1023-1935, Russian Journal of Electrochemistry, 2021, vol. 57, No. 11, pp. 1055-1069. © Pleiades Publishing, Ltd., 2021.*

Bian et al "High-Performance Li(Li0. 18Ni0.15Co0.15Mn0. 52)O2@Li4M5O12 Heterostructured Cathode Material Coated with a Lithium Borate Oxide Glass Layer", DOI: 10.1021/acs.chemmater. 5b02331 Chem. Mater. 2015, 27, 5745-5754.*

* cited by examiner

*Primary Examiner* — Mark Kopec
(74) *Attorney, Agent, or Firm* — Sughrue Mion, PLLC

(57) ABSTRACT

In a composite positive electrode active material including a lithium metal oxide as a positive electrode active material and a covering layer covering at least part of a surface of the positive electrode active material, the covering layer contains an Li element, a B element, and an O element, a molar ratio Li/B of the Li element to the B element in the covering layer is 1.5 to 3.0, and a coverage rate of the covering layer covering the positive electrode active material is 80% or more.

5 Claims, No Drawings

COMPOSITE POSITIVE ELECTRODE ACTIVE MATERIAL

CROSS-REFERENCE TO RELATED APPLICATION

This application claims priority to Japanese Patent Application No. 2022-033187 filed on Mar. 4, 2022, incorporated herein by reference in its entirety.

BACKGROUND

1. Technical Field

The present disclosure relates to a composite positive electrode active material.

2. Description of Related Art

In recent years, with the rapid spread of an information-related instrument and a communication instrument such as a personal computer, a video camera, and a mobile phone, development of a battery used as a power source for the devices above has been emphasized. Further, in the automobile industry and the like, development of a high-output and high-capacity battery for a battery electric vehicle and a hybrid electric vehicle is underway.

WO2020/022305 discloses that a lithium metal composite oxide provided with a covering layer containing Li, B and O is used as a positive electrode active material for a sulfide solid state battery.

Japanese Unexamined Patent Application Publication No. 2018-045802 (JP 2018-045802 A) discloses a lithium-nickel-cobalt-manganese composite oxide that is a positive electrode active material for a non-aqueous secondary battery and that contains boron on its surface.

SUMMARY

Further reduction in a battery resistance is required.

The present disclosure has been made in view of the above circumstances, and a main object thereof is to provide a composite positive electrode active material capable of reducing the battery resistance.

A composite positive electrode active material according to the present disclosure is a composite positive electrode active material including a lithium metal oxide as a positive electrode active material and a covering layer covering at least part of a surface of the positive electrode active material. The covering layer contains an Li element, a B element, and an O element, a molar ratio Li/B of the Li element to the B element in the covering layer is 1.5 to 3.0, and a coverage rate of the covering layer covering the positive electrode active material is 80% or more.

In the composite positive electrode active material according to the present disclosure, the positive electrode active material may be a positive electrode active material particle, and the composite positive electrode active material may be a composite positive electrode active material particle.

In the composite positive electrode active material according to the present disclosure, the composite positive electrode active material may be for a sulfide all-solid-state battery.

A method for manufacturing a composite positive electrode active material according to the present disclosure is a method for manufacturing the composite positive electrode active material, and includes: a step of supplying a slurry containing the positive electrode active material and a coating liquid to a spray dryer to dropletize the slurry and perform airflow drying of the dropletized slurry so as to obtain a precursor of the composite positive electrode active material; and a step of firing the precursor.

The coating liquid contains a lithium source, a boron source, and an oxygen source.

The present disclosure can provide a composite positive electrode active material capable of reducing a battery resistance.

DETAILED DESCRIPTION OF EMBODIMENTS

Hereinafter, embodiments according to the present disclosure will be described. Matters other than those particularly referred to in the present specification and necessary for carrying out the present disclosure (for example, the general configuration and manufacturing process of the composite positive electrode active material that do not characterize the present disclosure) can be understood as matters of design choice for those skilled in the related art. The present disclosure can be carried out based on content disclosed in the present specification and common knowledge in the technical field. In the present specification, the term "to" indicating a numerical range is used to include the numerical values before and after the term as lower and upper limit values.

Any combination of the upper limit value and the lower limit value in the numerical range can be adopted.

1. Composite Positive Electrode Active Material

A composite positive electrode active material according to the present disclosure is a composite positive electrode active material including a lithium metal oxide as a positive electrode active material and a covering layer covering at least part of a surface of the positive electrode active material. The covering layer contains an Li element, a B element, and an O element. A molar ratio Li/B of the Li element to the B element in the covering layer is 1.5 to 3.0. The coverage rate of the covering layer covering the positive electrode active material is 80% or more.

The shape of the composite positive electrode active material is not particularly limited, and may be plate shaped, particulate, and the like. The composite positive electrode active material may be composite positive electrode active material particles. An average particle diameter D50 of the composite positive electrode active material particles may be 1 μm to 20 μm, or may be 5 μm to 10 μm.

In the present disclosure, unless otherwise specified, the average particle diameter of particles is a volume-based median diameter (D50) measured by laser diffraction and scattering particle diameter distribution measurement. In the present disclosure, the median diameter (D50) is a diameter (volume average diameter) at which the cumulative volume of particles is half (50%) of the total volume when the particles are arranged in order from the smallest particle diameter.

The positive electrode active material may be lithium metal oxide. Examples of lithium metal oxides include lithium transition metal composite oxide represented by $LiCoO_2$, $LiNi_xM_{1-x}O_2$ (where x satisfies $0.3 \leq x < 1$ and M is at least one element selected from the group consisting of Co, Mn and Al), $LiMnO_2$, heterogeneous element-substituted Li—Mn spinel, lithium titanate, lithium metal phosphate, $Li_2SiO_3$, and $Li_4SiO_4$. Examples of lithium transition metal composite oxide include lithium nickel cobalt aluminate ($LiNi_{1-x-y}Co_xAl_yO_2$, x=0.05 to 0.2, y=0.05 to 0.2, NCA)

and lithium nickel cobalt manganese oxide ($LiNi_xCo_yMn_{1-x-y}O_2$, x=0.3 to 0.8, y=0.1 to 0.6, NCM), and examples of NCM include $LiNi_{1/3}Mn_{1/3}Co_{1/3}O_2$, NCM-523, NCM-622, and NCM-811. The heterogeneous element-substituted Li—Mn spinel includes, for example, $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, and $LiMn_{1.5}Zn_{0.5}O_4$. Lithium titanate includes, for example, $Li_4Ti_5O_{12}$. Lithium metal phosphate includes, for example, $LiFePO_4$, $LiMnPO_4$, $LiCoPO_4$, and $LiNiPO_4$.

The shape of the positive electrode active material is not particularly limited, and may be plate shaped, particulate, and the like. The positive electrode active material may be positive electrode active material particles. The positive electrode active material particles may be primary particles or secondary particles.

The covering layer covers at least part of the surface of the positive electrode active material. The covering layer contains the Li element, the B element, and the O element, and may be lithium borate. The composition of lithium borate includes $Li_3BO_3$, $Li_4B_2O_5$, $LiBO_2$, $Li_2B_4O_7$, and $LiB_3O_5$. In the present disclosure, the composition of the covering layer may be any one of the above. Further, the composition is not uniquely determined, and multiple compositions may be mixed. The crystal structure of lithium borate may be any of the crystal phases having the above composition, and may be glass or amorphous. A molar ratio Li/B of the Li element to the B element in the covering layer is 1.5 to 3.0. The coverage rate of the covering layer covering the positive electrode active material is 80% or more. The coverage rate of the covering layer can be calculated by observing a scanning electron microscope (SEM) image of the section of the particle or the like, can be calculated by calculating the surface element ratio by X-ray photoelectric spectroscopy (XPS), and can be calculated by time-of-flight secondary ion mass spectrometry (TOF-SIMS). The thickness of the covering layer is not particularly limited, and may be, for example, 0.1 nm or more, 0.5 nm or more, or 5 nm or more, or may be 500 nm or less, 300 nm or less, 100 nm or less, 50 nm or less, or 35 nm or less.

2. Method for Manufacturing Composite Positive Electrode Active Material

A method for manufacturing a composite positive electrode active material according to the present disclosure is a method for manufacturing the composite positive electrode active material, and includes: a step of supplying a slurry containing the positive electrode active material and a coating liquid to a spray dryer to dropletize the slurry and perform airflow drying of the dropletized slurry so as to obtain a precursor of the composite positive electrode active material; and a step of firing the precursor. The coating liquid contains a lithium source, a boron source, and an oxygen source.

According to the method for manufacturing the composite positive electrode active material of the present disclosure, the coverage rate of the covering layer that covers the positive electrode active material can be accurately 80% or more, and the composite positive electrode active material in which the coverage rate of the covering layer that covers the positive electrode active material is 80% or more can be obtained.

Step of Obtaining Precursor

The step of obtaining a precursor is a step of supplying the slurry containing the positive electrode active material and the coating liquid to the spray dryer to dropletize the slurry and perform airflow drying of the dropletized slurry so as to obtain the precursor of the composite positive electrode active material.

The coating liquid constitutes the covering layer that exhibits a predetermined function on the surface of the positive electrode active material after airflow drying and firing that will be described later. The covering layer may have, for example, a function of suppressing an increase in an interfacial resistance between the positive electrode active material and other substances. The type of coating liquid can be selected in accordance with the type of positive electrode active material to be covered and the intended function. The coating liquid contains a lithium source, a boron source, and an oxygen source. The lithium source is not particularly limited as long as the lithium source is a raw material containing lithium. Lithium ions may be included as the lithium source. For example, a coating liquid containing lithium ions as the lithium source may be obtained by dissolving a lithium compound such as LiOH, $LiNO_3$, or $Li_2SO_4$ in a solvent. Alternatively, the coating liquid may contain a lithium alkoxide as a lithium source. $LiOH{\cdot}H_2O$, for example, can be used as the lithium source. The boron source is not particularly limited as long as the boron source is a raw material containing boron. As the boron source, for example, a compound containing boron and oxygen can be used. From the viewpoint of easy handling and excellent quality stability, boron oxide, boron oxoacid, and mixtures thereof can be used, and orthoboric acid may be used. The oxygen source is not particularly limited as long as the oxygen source is a raw material containing oxygen. As the oxygen source, for example, those containing oxygen among the lithium sources and boron sources can be used.

The "slurry" is a suspension body or a suspension liquid containing the positive electrode active material and the coating liquid, and may have sufficient fluidity to enable dropletization. The solid content concentration at which dropletization is possible may vary depending on the type of positive electrode active material, the type of coating liquid, the conditions for dropletization, and the like. The solid content concentration in the slurry is not particularly limited, and may be, for example, 1 vol % or more, 5 vol % or more, 10 vol % or more, 20 vol % or more, 25 vol % or more, 30 vol % or more, 35 vol % or more, 40 vol % or more, 45 vol % or more, or 50 vol % or more, or may be 70 vol % or less, 65 vol % or less, 60 vol % or less, 55 vol % or less, 50 vol % or less, 45 vol % or less, 40 vol % or less, or 35 vol % or less. From the viewpoint of obtaining slurry droplets more easily, the solid content concentration of the slurry may be 40 vol % or less.

"Dropletization" of the slurry means changing a slurry containing the positive electrode active material and the coating liquid into particles containing the positive electrode active material and the coating liquid. "Slurry droplets" are particles of slurry containing the positive electrode active material and the coating liquid. The size of the slurry droplets is not particularly limited. In the method according to the present disclosure, "airflow drying" means drying while slurry droplets are being suspended in a high-temperature airflow (heated gas). "Airflow drying" may include concomitant manipulation using dynamic air streams, in addition to drying. A force is continuously applied to the slurry droplets by continuously applying hot air (heated gas) to the slurry droplets by airflow drying.

A conventionally known spray dryer can be employed as the spray dryer. The air supply temperature of the heated gas in the spray dryer may be any temperature as long as the solvent can be volatilized from the slurry droplets. For example, the temperature may be 100° C. or higher, 110° C. or higher, 120° C. or higher, 130° C. or higher, 140° C. or higher, 150° C. or higher, 160° C. or higher, 170° C. or higher, 180° C. or higher, 190° C. or higher, 200° C. or higher, 210° C. or higher, or 220° C. or higher. The supply air volume of heated gas supplied to the spray dryer can be appropriately set in consideration of the size of the device to be used, the amount of slurry droplets supplied, and the like. For example, the supply air volume of the heated gas is 0.10 $m^3$/min or more, 0.15 $m^3$/min or more, 0.20 $m^3$/min or more, 0.25 $m^3$/min or more, 0.30 $m^3$/min or more, 0.35 $m^3$/min or more, 0.40 $m^3$/min or more, 0.45 $m^3$/min or more, or 0.50 $m^3$/min or more, or may be 5.00 $m^3$/min or less, 4.00 $m^3$/min or less, 3.00 $m^3$/min or less, 2.00 $m^3$/min or less, or 1.00 $m^3$/min or less. The air supply rate (flow velocity) of the heated gas can also be appropriately set in consideration of the size of the device to be used, the amount of slurry droplets supplied, and the like. For example, the flow velocity of the heated gas may be 1 m/sec or more or 5 m/sec or more, or may be 50 m/sec or less or 10 m/sec or less in at least part of the system. The processing time (drying time) with the heated gas can also be appropriately set in consideration of the size of the device to be used, the amount of slurry droplets supplied, and the like. For example, the processing time may be five seconds or less, or may be one second or less. As the heated gas, a heated gas that is substantially inert to the positive electrode active material and the coating liquid may be used. For example, an oxygen-containing gas such as air, an inert gas such as nitrogen or argon, dry air with a low dew point, or the like can be used. In that case, the dew point may be −10° C. or lower, −50° C. or lower, or −70° C. or lower.

Firing Step

A firing step is a step of firing the precursor. As a firing device, for example, a muffle furnace, a hot plate, or the like can be used, but the device is not limited to these. In the firing step, the precursor may be subjected to firing at 200° C. to 450° C. The firing time may be, for example, one hour or more, two hours or more, three hours or more, four hours or more, five hours or more, or six hours or more, or may be 20 hours or less, 15 hours or less, or 10 hours or less. The firing atmosphere may be, for example, an air atmosphere, a vacuum atmosphere, a dry air atmosphere, a nitrogen gas atmosphere, or an argon gas atmosphere.

Battery

The composite positive electrode active material according to the present disclosure can be used as a positive electrode material for various batteries, and among the batteries, may be a positive electrode material for sulfide all-solid-state batteries. A battery according to the present disclosure may include a positive electrode, an electrolyte layer, and a negative electrode. The battery may be a primary battery or a secondary battery, and in particular, a secondary battery. The secondary battery can be repeatedly charged and discharged. The secondary battery is useful, for example, as an on-board battery. The battery may be an aqueous battery, a non-aqueous battery, an all-solid-state battery, and the like. Further, the battery may be a lithium battery, a lithium ion battery, and the like. Further, the all-solid-state battery may be an all-solid lithium secondary battery, an all-solid-state lithium ion secondary battery, and the like. The all-solid-state battery may be a sulfide all-solid-state battery using a sulfide-based solid electrolyte as a solid electrolyte. Examples of the shape of the battery include a coin type, a laminated type, a cylindrical type, and a square type. Applications of the battery are not particularly limited, and examples thereof include power sources for vehicles such as hybrid electric vehicles (HEV), plug-in hybrid electric vehicles (PHEV), battery electric vehicles (BEV), gasoline vehicles, and diesel vehicles. In particular, the battery may be used as a drive power source for hybrid electric vehicles, plug-in hybrid electric vehicles, or battery electric vehicles. Also, the battery according to the present disclosure may be used as a power source for mobile bodies other than vehicles (for example, railroads, ships, and aircraft), and may be used as a power source for electric products such as an information processing device.

Positive Electrode

The positive electrode has a positive electrode layer and a positive electrode current collector when necessary.

Positive Electrode Layer

The positive electrode layer contains the composite positive electrode active material according to the present disclosure, and may contain a conductive material, a solid electrolyte, a binder, and the like as optional components.

As the conductive material, a known material can be used, and examples thereof include carbon materials and metal particles. Examples of carbon materials include at least one selected from the group consisting of acetylene black, furnace black, vapor grown carbon fiber (VGCF), a carbon nanotube, and a carbon nanofiber. Among the above, from the viewpoint of electron conductivity, at least one selected from the group consisting of VGCF, a carbon nanotube, and a carbon nanofiber may be used. Examples of metal particles include particles of Ni, Cu, Fe, and SUS. The content of the conductive material in the positive electrode layer is not particularly limited.

As the solid electrolyte, the same ones as those exemplified in the solid electrolyte layer can be exemplified. The content of the solid electrolyte in the positive electrode layer is not particularly limited, but may be in the range of, for example, 1% by mass to 80% by mass when the total mass of the positive electrode layer is 100% by mass.

As a binding agent (binder), polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, acrylonitrile-butadiene rubber (ABR), butadiene rubber (BR), polyvinylidene fluoride (PVdF), and styrene-butadiene rubber (SBR) can be exemplified. The content of the binder in the positive electrode layer is not particularly limited.

The thickness of the positive electrode layer is not particularly limited, but may be, for example, 10 μm to 100 μm.

The positive electrode layer can be formed by a conventionally known method. For example, the positive electrode layer can be obtained by introducing the composite positive electrode active material and, as necessary, other components into a solvent and stirring the solvent to prepare a positive electrode layer forming paste, and applying the positive electrode layer forming paste onto one surface of a support body and drying the applied paste. Examples of the solvent include, for example, butyl acetate, butyl butyrate, mesitylene, tetralin, heptane, and N-methyl-2-pyrrolidone (NMP). The method for applying the positive electrode layer forming paste onto one surface of the support body is not particularly limited, and examples of the method include a doctor blade method, a metal mask printing method, an electrostatic coating method, a dip coating method, a spray coating method, a roll coating method, and a gravure coating method, and screen printing method. As the support body, a support body with self-supporting properties can be appropriately selected and used, and there is no particular limitation. For example, metal foils such as Cu and Al can be used.

As another method for forming the positive electrode layer, the positive electrode layer may be formed by pressure-molding powder of a positive electrode mixture containing the composite positive electrode active material and other components as necessary. When the powder of the positive electrode mixture is pressure-molded, normally, a pressing pressure of 1 MPa or more and 2000 MPa or less as a surface pressure and 1 ton/cm or more and 100 ton/cm or less as a linear pressure are applied. The pressurizing method is not particularly limited, but examples thereof include a method for applying pressure using a flat plate press, a roll press, and the like.

Positive Electrode Current Collector

A known metal that can be used as a battery current collector can be used as the positive electrode current collector. As the metals above, a metal material containing one or more elements selected from the group consisting of Cu, Ni, Al, V, Au, Pt, Mg, Fe, Ti, Co, Cr, Zn, Ge, and In can be exemplified. Examples of positive electrode current collectors include SUS, aluminum, nickel, iron, titanium and carbon. The shape of the positive electrode current collector is not particularly limited, and various shapes such as a foil shape and a mesh shape can be used. The thickness of the positive electrode current collector varies depending on the shape, and may be, for example, within the range of 1 μm to 50 μm, or within the range of 5 μm to 20 μm.

Negative Electrode

A negative electrode includes a negative electrode layer and a negative electrode current collector when necessary.

Negative Electrode Layer

The negative electrode layer contains at least a negative electrode active material, and contains a solid electrolyte, a conductive material, a binder, and the like when necessary. Examples of negative electrode active materials include graphite, mesocarbon microbeads (MCMB), highly oriented pyrolytic graphite (HOPG), hard carbon, soft carbon, elemental lithium, lithium alloy, elemental Si, Si alloy, and $Li_4Ti_5O_{12}$. Examples of lithium alloy include Li—Au, Li—Mg, Li—Sn, Li—Si, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li-TI, Li—Te, and Li—At. Examples of Si alloy include alloys with metals such as Li, and may be an alloy with at least one metal selected from the group consisting of Sn, Ge, and Al. The shape of the negative electrode active material is not particularly limited, and may be particulate, plate shaped, and the like. When the negative electrode active material is particulate, the negative electrode active material may be primary particles or secondary particles. The conductive material and the binder used for the negative electrode layer can be the same as those exemplified for the positive electrode layer. As the solid electrolyte to be used for the negative electrode layer, the same ones as those exemplified in the solid electrolyte layer can be exemplified. The thickness of the negative electrode layer is not particularly limited, but may be, for example, 10 μm to 100 μm. The content of the negative electrode active material in the negative electrode layer is not particularly limited, but may be, for example, 20% by mass to 90% by mass. Examples of the method for forming the negative electrode layer include a method for applying a negative electrode layer forming paste containing the negative electrode active material onto a support body and drying the paste. Examples of the support body include those exemplified for the positive electrode layer.

Negative Electrode Current Collector

The material of the negative electrode current collector may be a material that does not alloy with Li, and may be, for example, SUS, copper, and nickel. Examples of the shape of the negative electrode current collector include a foil shape and a plate shape. The shape of the negative electrode current collector in a plan view is not particularly limited. Examples thereof include a circular shape, an elliptical shape, a rectangular shape, and an arbitrary polygonal shape. Further, the thickness of the negative electrode current collector varies depending on the shape, and may be, for example, within the range of 1 μm to 50 μm, or within the range of 5 μm to 20 μm.

Electrolyte Layer

The electrolyte layer contains at least an electrolyte. An aqueous electrolyte, a non-aqueous electrolyte, a gel electrolyte, a solid electrolyte, and the like can be used as the electrolyte. These may be used singly or in combination of two or more.

The solvent of the aqueous electrolytic solution contains water as a main component. That is, water may account for 50 mol % or more, particularly 70 mol % or more, and further 90 mol % or more with the total amount of the solvent (liquid component) constituting the electrolytic solution (100 mol %) as a reference. On the other hand, the upper limit of the proportion of water in the solvent is not particularly limited.

The solvent contains water as a main component, but may contain a solvent other than water. Examples of the solvent other than water include one or more selected from the group consisting of ethers, carbonates, nitriles, alcohols, ketones, amines, amides, sulfur compounds and hydrocarbons. The solvent other than water may be 50 mol % or less, particularly 30 mol % or less, and further 10 mol % or less with the total amount (100 mol %) of the solvent (liquid component) constituting the electrolytic solution as a reference.

Aqueous electrolytes used in the present disclosure include electrolytes. A conventionally known electrolyte can be used for the aqueous electrolyte. Examples of electrolytes include lithium salts, nitrates, acetates, and sulfates of imidic acid compounds. Specific examples of electrolytes include lithium bis(fluorosulfonyl)imide (LiFSI; CAS No. 171611-11-3), lithium bis(trifluoromethanesulfonyl)imide (LiTFSI; CAS No. 90076-65-6), lithium bis(penta Fluoroethanesulfonyl)imide (LiBETI; CAS No. 132843-44-8), lithium bis (nonafluorobutanesulfonyl)imide (CAS No. 119229-99-1), lithium nonafluoro-N-[(trifluoromethane) sulfonyl]butane sulfonylamide (CAS No. 176719-70-3), lithium N,N-hexafluoro-1,3-disulfonylimide (CAS No. 189217-62-7), $CH_3COOLi$, $LiPF_6$, $LiBF_4$, $Li_2SO_4$, and $LiNO_3$.

The concentration of the electrolyte in the aqueous electrolytic solution can be appropriately set within a range not exceeding the saturation concentration of the electrolyte with respect to the solvent, depending on the required battery characteristics. This is because when the solid electrolyte remains in the aqueous electrolyte, the solid may impede the battery reaction. For example, when LiTFSI is used as the electrolyte, the aqueous electrolyte may contain 1 mol or more, particularly 5 mol or more, and further 7.5 mol or more of LiTFSI per 1 kg of water. The upper limit is not particularly limited, and may be, for example, 25 mol or less.

As the non-aqueous electrolytic solution, normally, the non-aqueous electrolytic solution containing a lithium salt and a non-aqueous solvent is used. Examples of lithium salts include inorganic lithium salts such as $LiPF_6$, $LiBF_4$, $LiClO_4$ and $LiAsF_6$ and organic lithium salts such as $LiCF_3SO_3$, $Lin(SO_2CF_3)_2$ (Li-TFSI), $LiN(SO_2C_2F_5)_2$, and $LiC(SO_2CF_3)_3$. Examples of non-aqueous solvents include ethylene carbonate (EC), propylene carbonate (PC), butylene carbonate (BC), dimethyl carbonate (DMC), diethyl carbonate (DEC), ethylmethyl carbonate (EMC), γ-butyrolactone, sulfolane, acetonitrile (AcN), dimethoxymethane, 1,2-dimethoxyethane (DME), 1,3-dimethoxypropane, diethyl ether, tetraethylene glycol dimethyl ether (TEGDME), tetrahydrofuran, 2-methyltetrahydrofuran, dimethylsulfoxide (DMSO) and a mixture thereof. From the viewpoint of ensuring a high dielectric constant and a low viscosity, the non-aqueous solvent may be a mixture of a cyclic carbonate compound such as EC, PC, and BC having a high dielectric constant and a high viscosity and a cyclic carbonate compound such as DMC, DEC, and EMC having a low dielectric constant and a low viscosity, or may be a mixture of EC and DEC. The concentration of the lithium salt in the non-aqueous electrolyte may be, for example, 0.3 M to 5 M.

A gel electrolyte is generally obtained by adding a polymer to a non-aqueous electrolytic solution to form a gel. Specifically, the gel electrolyte is obtained by adding a polymer such as polyethylene oxide, polypropylene oxide, polyacrylonitrile, polyvinylidene fluoride (PVdF), polyurethane, polyacrylate, and cellulose to the non-aqueous electrolytic solution described above and forming a gel.

The electrolyte layer may be a separator that is impregnated with an electrolyte such as the aqueous electrolyte described above and that suppresses contact between the positive electrode layer and the negative electrode layer. The material of the separator is not particularly limited as long as the material is a porous film, and may be, for example, resins such as polyethylene (PE), polypropylene (PP), polyester, cellulose and polyamide, and in particular, may be polyethylene and polypropylene. Moreover, the separator may have a single-layer structure or a multilayer structure. Examples of the separator having a multi-layer structure include a separator having a two-layer structure of PE-PP and a separator having a three-layer structure of PP-PE-PP or PE-PP-PE. The separator may be a resin nonwoven fabric, a nonwoven fabric such as a glass fiber nonwoven fabric, and the like.

Solid Electrolyte Layer

The electrolyte layer may be a solid electrolyte layer composed of a solid. The solid electrolyte layer contains at least a solid electrolyte. As the solid electrolyte to be contained in the solid electrolyte layer, known solid electrolytes that can be used in all-solid-state batteries can be appropriately used, and examples thereof include sulfide-based solid electrolytes, oxide-based solid electrolytes, hydride-based solid electrolytes, and halide-based solid electrolytes, and inorganic solid electrolytes such as nitride-based solid electrolyte. The sulfide-based solid electrolyte may contain sulfur(S) as the main component of the anion element. The oxide-based solid electrolyte may contain oxygen (O) as a main component of the anion element. The hydride-based solid electrolyte may contain hydrogen (H) as the main component of the anion element. The halide-based solid electrolyte may contain halogen (X) as the main component of the anion element. The nitride-based solid electrolyte may contain nitrogen (N) as a main component of the anion element.

The sulfide-based solid electrolyte may be sulfide glass, crystallized sulfide glass (glass ceramics), or a crystalline material obtained by solid-phase reaction treatment of a raw material composition. The crystalline state of the sulfide-based solid electrolyte can be confirmed, for example, by subjecting the sulfide-based solid electrolyte to powder X-ray diffraction measurement using CuKα rays.

The sulfide glass can be obtained by subjecting a raw material composition (for example, a mixture of $Li_2S$ and $P_2S_5$) to amorphous processing. Examples of amorphous processing include mechanical milling.

The glass ceramics can be obtained, for example, by applying heat treatment to sulfide glass. The heat treatment temperature may be any temperature higher than the crystallization temperature (Tc) observed by thermal analysis measurement of sulfide glass, and is normally 195° C. or higher. On the other hand, the upper limit of the heat treatment temperature is not particularly limited. The crystallization temperature (Tc) of sulfide glass can be measured by differential thermal analysis (DTA). The heat treatment time is not particularly limited as long as the desired crystallinity of the glass-ceramics is obtained, but may be, for example, within a range of one minute to 24 hours, and in particular, may be within a range of one minute to 10 hours. The method for heat treatment is not particularly limited, but may be, for example, a method using a firing furnace.

Examples of the oxide-based solid electrolyte include a solid electrolyte containing an Li element, a Y element (Y is at least one of Nb, B, Al, Si, P, Ti, Zr, Mo, W, and S), and an O element. Specific examples of oxide-based solid electrolytes include garnet type solid electrolytes such as $Li_7La_3Zr_2O_{12}$, $Li_{7-x}La_3(Zr_{2-x}Nb_x)O_{12}$ $(0 \le x \le 2)$, and $Li_5La_3Nb_2O_{12}$; perovskite type solid electrolytes such as $(Li, La)TiO_3$, $(Li, La)NbO_3$, and $(Li, Sr)(Ta, Zr)O_3$; nasicon type solid electrolytes such as $Li(Al, Ti)(PO_4)_3$ and $Li(Al, Ga)(PO_4)_3$; Li—P—O-based solid electrolytes such as $Li_3PO_4$, LIPON (a compound obtained by substituting a part of O of $Li_3PO_4$ with N); and Li—B—O-based solid electrolytes such as $Li_3BO_3$ and a compound obtained by substituting a part of O of $Li_3BO_3$ with C. In the present disclosure, the notation "(A, B, C)" in chemical formulas means "at least one selected from the group consisting of A, B, and C."

The hydride-based solid electrolyte contains, for example, Li and a complex anion containing hydrogen. Examples of the complex anion include $(BH_4)^-$, $(NH_2)^-$, $(AlH_4)^-$, and $(AlH_6)^{3-}$.

The halide-based solid electrolyte is represented, for example, by the following compositional formula (1).

$$Li_\alpha M_\beta X_\gamma \quad \text{Formula (1)}$$

In the composition formula (1), α, β, and γ are each independently a value greater than 0. M contains at least one element selected from the group consisting of metal elements other than Li and metalloid elements. X contains at least one selected from the group consisting of F, Cl, Br, and I. In the present disclosure, "metalloid elements" are B, Si, Ge, As, Sb and Te. "Metallic element" means all elements contained in groups 1 to 12 of the periodic table except hydrogen, as well as all elements contained in groups 13 to 16 of the periodic table except B, Si, Ge, As, Sb, Te, C, N, P, O, S, and Se. That is, the term "metalloid element" or "metallic element" refers to a group of elements that can become cations when an inorganic compound is formed with a halogen element. More specifically, examples of the halide-based solid electrolyte include $Li_3YX_6$, $Li_2MgX_4$, $Li_7FeX_4$, $LiAlX_4$, $LiGaX_4$, $LiInX_4$, $Li_3AlX_6$, $Li_3GaX_6$, and $Li_3InX_6$. Here, X is at least one selected from the group consisting of F, Cl, Br, and I.

Examples of the nitride-based solid electrolytes include $Li_3N$.

The shape of the solid electrolyte may be particulate from the viewpoint of ease of handling. The average particle diameter of the particles of the solid electrolyte is not particularly limited, but is, for example, 10 nm or more, and may be 100 nm or more. On the other hand, the average particle diameter of the particles of the solid electrolyte is, for example, 25 μm or less, and may be 10 μm or less.

The solid electrolyte can be used singly or in combination of two or more. Further, when two or more kinds of solid electrolytes are used, two or more kinds of solid electrolytes may be mixed, or two or more layers of each solid electrolyte may be formed to form a multilayer structure. The proportion of the solid electrolyte in the solid electrolyte layer is not particularly limited. The proportion is, for example, 50% by mass or more, and may be within the range of 60% by mass or more and 100% by mass or less, may be within the range of 70% by mass or more and 100% by mass or less, or may be 100% by mass.

The solid electrolyte layer may contain a binding agent from the viewpoint of developing plasticity. As such a binding agent, the materials exemplified as the binding agent used for the positive electrode layer can be exemplified. However, in order to facilitate high output, the binding agent contained in the solid electrolyte layer may be 5% by mass or less from the viewpoint of making it possible to form the solid electrolyte layer in which excessive aggregation of the solid electrolyte is suppressed and the solid electrolyte is uniformly dispersed.

The thickness of the solid electrolyte layer is not particularly limited, and is normally 0.1 μm or more and 1 mm or less. Examples of the method for forming the solid electrolyte layer include a method for applying the solid electrolyte layer forming paste containing a solid electrolyte onto a support body and drying the paste, and a method for pressure-molding a powder of a solid electrolyte material containing a solid electrolyte. Examples of the support body include those exemplified for the positive electrode layer. When the solid electrolyte material powder is pressure-molded, normally, a press pressure of about 1 MPa to 2000 MPa is applied. The pressurization method is not particularly limited. Examples of the pressurization method include the pressurization method exemplified in the formation of the positive electrode layer.

When necessary, a battery includes an exterior body, a restraining member, and the like for housing a laminated body including the positive electrode current collector, the positive electrode layer, the electrolyte layer, the negative electrode layer, and the negative electrode current collector in this order. The material of the exterior body is not particularly limited as long as the material is stable in the electrolyte. Examples thereof include polypropylene, polyethylene, and resins such as acrylic resins. The restraining member only needs to be able to apply a restraining pressure to the laminated body in a laminating direction, and any known restraining member that can be used as a restraining member for a battery can be used. Examples of the restraining member include a restraining member provided with plate shaped portions that interpose both surfaces of the laminated body therebetween, a rod shaped portion that connects the two plate shaped portions, and an adjusting portion that is connected to the rod shaped portion and adjusts the restraining pressure by a screw structure or the like. A desired restraining pressure can be applied to the laminated body by the adjusting portion. The restraining pressure is not particularly limited, but may be, for example, 0.1 MPa or more, 1 MPa or more, or 5 MPa or more. This is because an increase in the restraining pressure has an advantage of facilitating good contact between the layers. On the other hand, the restraining pressure is not particularly limited, but may be, for example, 100 MPa or less, 50 MPa or less, or 20 MPa or less. This is because when the restraining pressure is too large, the restraining member is required to have a high rigidity, which may increase the size of the restraining member. The battery may have only one laminated body, or may have a plurality of laminated bodies laminated on each other.

In a method for manufacturing an all-solid-state battery when the battery of the present disclosure is an all-solid-state battery, for example, first, the solid electrolyte layer forming paste is applied to a support body and dried to form the solid electrolyte layer. Then, the positive electrode layer is obtained by applying the positive electrode layer forming paste containing the composite positive electrode active material on one surface of the solid electrolyte layer and drying the applied paste. After that, the all-solid-state battery may be formed by peeling off the support body from the solid electrolyte layer, applying the negative electrode layer forming paste to the other surface of the solid electrolyte layer and drying the paste to form the negative electrode layer, and when necessary, attaching the positive electrode current collector to the surface on the opposite side to the solid electrolyte layer of the positive electrode layer and attaching the negative electrode current collector to the surface on the opposite side to the solid electrolyte layer of the negative electrode layer.

Example 1

Preparation of Coating Liquid

The coating liquid was prepared by dissolving 7.94 g of LiOH. $H_2O$ and 7.79 g of $H_3BO_3$ in 184.27 mL of water.

Preparation of Slurry containing Positive Electrode Active Material and Coating Liquid $LiNi_{1/3}Mn_{1/3}Co_{1/3}O_2$ as the positive electrode active material was placed in amount of 20 g in a mixer container, added to the coating liquid such that the solid content concentration was 60%, and stirred with a magnetic stirrer.

Preparation of Precursor of Composite Positive Electrode Active Material

The slurry prepared as above was supplied to a spray dryer (B-290 made by Buchi) at a rate of 0.5 g/sec using a liquid feed pump to dropletize the slurry and perform airflow drying of the slurry droplets, and a precursor of the composite positive electrode active material was obtained. The operating condition of the spray dryer was air supply temperature: 200° C. and supply air volume: 0.45 $m^3$/min.

Firing of Precursor of Composite Positive Electrode Active Material The composite positive electrode active material was obtained by applying heat treatment to the precursor at 200° C. in an air atmosphere for five hours using a muffle furnace (S90 made by KDF). The average particle diameter of the composite positive electrode active material was 5 μm.

Example 2

The composite positive electrode active material was obtained in the same manner as in Example 1, except that 10.58 g of LiOH. $H_2O$ and 7.79 g of $H_3BO_3$ were dissolved in 181.63 mL of water to prepare the coating liquid.

Example 3

The composite positive electrode active material was obtained in the same manner as in Example 1, except that 15.88 g of $LiOH \cdot H_2O$ and 7.79 g of $H_3BO_3$ were dissolved in 176.33 mL of water to prepare the coating liquid.

Comparative Example 1

The coating liquid was prepared by dissolving 5.29 g of LiOH. $H_2O$ and 7.79 g of $H_3BO_3$ in 186.93 mL of water. The coating liquid in an amount of 55 mL was added to 10 g of the positive electrode active material, stirred at 25° C. for one hour, and dried at 130° C. for two hours to obtain a precursor of the composite positive electrode active material. The composite positive electrode active material was obtained by applying heat treatment to the precursor at 350° C. in an air atmosphere for five hours using a muffle furnace (S90 made by KDF).

Comparative Example 2

The composite positive electrode active material was obtained in the same manner as in Example 1, except that 5.29 g of LiOH. $H_2O$ and 7.79 g of $H_3BO_3$ were dissolved in 187.45 mL of water to prepare the coating liquid.

Comparative Example 3

The coating liquid was prepared by dissolving 15.88 g of $LiOH \cdot H_2O$ and 7.79 g of $H_3BO_3$ in 176.33 mL of water. The coating liquid in an amount of 10.4 mL was added to 10 g of the positive electrode active material, stirred at 25° C. for one hour, and dried at 130° C. for two hours to obtain a precursor of the composite positive electrode active material. The composite positive electrode active material was obtained by applying heat treatment to the precursor at 350° C. in an air atmosphere for five hours using a muffle furnace (S90 made by KDF).

Evaluation of Coverage Rate of Covering Layer

The coverage rate of the covering layer was calculated based on the following formula from the proportion of elements present on the outermost surface of the composite positive electrode active material using an X-ray photoelectron spectrometer (XPS, Quantam 2000 made by Ulvac-Phi).

$$\text{Coverage rate } (\%) = B/(Mn+Co+Ni+B) \times 100$$

Evaluation of Average Particle Diameter D50 of Composite Positive Electrode Active Material A laser diffraction particle diameter distribution measuring device (SALD-7500 made by Shimadzu Corporation) was used to measure the average particle diameter D50 on the composite positive electrode active material at an integrated value of 50% in the volume-based particle diameter distribution.

Evaluation of Thickness of Covering Layer

After processing the section of the resin-embedded composite positive electrode active material with an ion milling device (IM4000PLUS made by Hitachi High-Tech), FE-SEM observation (Regulus 8100 made by Hitachi High-Tech) was performed on the composite positive electrode active material, the thickness of the covering layer was measured at any selected five points, and the average value was calculated as the thickness of the covering layer.

Quantification of Constituent Elements in Covering Layer (Molar Ratio of Li/B)]

The constituent elements (mainly lithium and boron) in the covering layer were quantified by chemical analysis. The lithium salt forming the covering layer is insoluble in organic solvents and readily soluble in water. The slurry is prepared by dispersing 5 g of the composite positive electrode active material in 95 mL of pure water at 25° C., stirring the slurry for 10 minutes, filtering, and adding pure water to the filtrated liquid such that the total amount becomes 200 mL to prepare an analysis sample solution, and the analysis sample solution was prepared appropriately, and the contents of lithium and boron contained in the analysis sample solution were measured using a multi-type ICP emission spectrometer (ICPE-9000 made by Shimadzu Corporation). The Li/B molar ratio was calculated from the contents of lithium and boron.

Preparation of Positive Electrode

Each positive electrode was produced by the following method using the composite positive electrode active materials of Examples 1 to 3 and Comparative Examples 1 to 3. The composite positive electrode active material and the sulfide-based solid electrolyte ($Li_2S$—$P_2S_5$-based glass ceramics containing LiI, D50=0.8 μm) were weighed so as to have a volume ratio of 6:4, and were introduced into heptane together with 3% by mass of vapor grown carbon fiber (VGCF) as a conductive material and 0.7% by mass of butadiene rubber as a binder. Then, a positive electrode mixture was produced by mixing the above. After the prepared positive electrode mixture was sufficiently dispersed with an ultrasonic homogenizer (UH-50 made by SMT), the mixture was coated on an aluminum foil as the positive electrode current collector and dried at 100° C. for 30 minutes such that the positive electrode layer was formed on the positive electrode current collector. After that, the positive electrode was obtained by punching the sample to a size of 1 $cm^2$.

Preparation of Negative Electrode

A sulfide-based solid electrolyte ($Li_2S$—$P_2S_5$-based glass ceramics containing LiI, D50=0.8 μm), a conductive vapor grown carbon fiber (VGCF) as a conductive material of 1% by mass, butadiene rubber as a binder of 2% by mass, and heptane were introduced into a kneading vessel of the FILMIX device (30-L made by PRIMIX) and stirred at 20000 rpm for 30 minutes. Then, the negative electrode active material ($Li_4Ti_5O_{12}$ particles, D50=1 μm) and the solid electrolyte were introduced into the kneading vessel such that the volume ratio thereof is 7:3, and stirred at 15000 rpm for 60 minutes with the FILMIX device to prepare a negative electrode mixture. The prepared negative electrode mixture was applied onto a copper foil as the negative electrode current collector and dried at 100° C. for 30 minutes to form the negative electrode layer on the negative electrode current collector. After that, the negative electrode was obtained by punching the sample to a size of 1 $cm^2$.

Preparation of Solid Electrolyte Layer

A sulfide-based solid electrolyte ($Li_2S$—$P_2S_5$-based glass ceramics containing LiI, D50=2.5 μm) in an amount of 64.8 mg was placed in a cylindrical ceramic having an inner diameter sectional area of 1 $cm^2$, and after smoothing was applied, the solid electrolyte was pressed with 1 ton/$cm^2$ to form the solid electrolyte layer.

Production of Battery

The positive electrode prepared on one side of the solid electrolyte layer was superimposed such that the positive electrode layer was in contact with the solid electrolyte layer, the negative electrode prepared on the other side was superimposed such that the negative electrode layer was in contact with the solid electrolyte layer, and the layers were pressed with 6 tons/$cm^2$ for one minute. Next, stainless rods were put into both electrodes and restrained with one ton to obtain an all-solid-state lithium ion secondary battery.

Battery Evaluation

For the all-solid-state lithium ion secondary battery, the capacity was confirmed by constant current-constant voltage charging and discharging between 1.5 V and 3.0 V at a ⅓ C rate. After that, the SOC was adjusted to 50% at the ⅓C rate. After that, the interfacial resistance in the initial state was obtained by alternating-current (AC) impedance measurement. AC impedance was measured at 25° C., 10 mV, and 0.1 Hz to 106 Hz, an arc was fitted to the Cole-Cole plot, and the distance between the two points of intersection between the fitted arc and the actual axis was taken as the interfacial resistance. The obtained interfacial resistance was defined as the initial resistance. The interfacial resistance of the all-solid-state lithium ion secondary battery according to each of the examples and the comparative examples was relativized and evaluated using the interfacial resistance of the all-solid-state lithium ion secondary battery of Example 1 as a reference (1.0). The results are shown in Table 1.

TABLE 1

| | Li/B (molar ratio) | Coverage rate (%) | Thickness of covering layer (nm) | Resistance with respect to Example 1 (–) |
|---|---|---|---|---|
| Comparative Example 1 | 1.0 | 38 | 12 | 4.5 |
| Comparative Example 2 | 1.0 | 82 | 32 | 2.1 |
| Comparative Example 3 | 3.0 | 22 | 10 | 4.1 |
| Example 1 | 1.5 | 84 | 35 | 1.0 |
| Example 2 | 2.0 | 80 | 22 | 0.9 |
| Example 3 | 3.0 | 89 | 30 | 0.8 |

Evaluation Results

As shown in Examples 1 to 3 in Table 1, it has been verified that, when the coverage rate is 80% or more and the Li/B ratio is 1.5 or more, an increase in the Li/B ratio increases the lithium ion conductivity in the covering layer, and the resistance can be reduced. As shown in Comparative Example 2, it can be understood that, when the Li/B ratio is less than 1.5 even when the coverage rate is 80% or more, the lithium ion conductivity in the covering layer is low and the resistance is increased. As shown in Comparative Example 3, it can be understood that, when the Li/B ratio is 3.0 even when the coverage rate is 80% or more, the lithium ion conductivity in the covering layer is low and the resistance is increased.

What is claimed is:

1. A composite positive electrode active material including a lithium metal oxide as a positive electrode active material and a covering layer covering at least part of a surface of the positive electrode active material, wherein:

the covering layer contains an Li element, a B element, and an O element;

a molar ratio Li/B of the Li element to the B element in the covering layer is 1.5 to 3.0; and a coverage rate of the covering layer covering the positive electrode active material is 84%-89%.

2. The composite positive electrode active material according to claim 1, wherein:

the positive electrode active material is a positive electrode active material particle; and the composite positive electrode active material is a composite positive electrode active material particle.

3. A sulfide all-solid-state battery comprising the composite positive electrode active material according to claim 1.

4. A method for manufacturing the composite positive electrode active material according to claim 1, comprising:

a step of supplying a slurry containing the positive electrode active material and a coating liquid to a spray dryer to dropletize the slurry and perform airflow drying of the dropletized slurry so as to obtain a precursor of the composite positive electrode active material; and a step of firing the precursor, wherein the coating liquid contains a lithium source, a boron source, and an oxygen source.

5. The composite positive electrode active material according to claim 1, wherein a thickness of the covering layer is in the range of 22 nm to 35 nm.

* * * * *